US012684533B2

(12) United States Patent
Nam et al.

(10) Patent No.: US 12,684,533 B2
(45) Date of Patent: Jul. 14, 2026

(54) ADAPTATION OF PROCESSING TIMELINES FOR HIGH FREQUENCY BANDS

(71) Applicant: QUALCOMM Incorporated, San Diego, CA (US)

(72) Inventors: Wooseok Nam, San Diego, CA (US); Jing Sun, San Diego, CA (US); Jae Ho Ryu, San Diego, CA (US); Hari Sankar, San Diego, CA (US); Tao Luo, San Diego, CA (US); Xiaoxia Zhang, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/654,205

(22) Filed: Mar. 9, 2022

(65) Prior Publication Data

US 2022/0322298 A1    Oct. 6, 2022

Related U.S. Application Data

(60) Provisional application No. 63/170,929, filed on Apr. 5, 2021.

(51) Int. Cl.
| | |
|---|---|
| *H04W 72/02* | (2009.01) |
| *H04W 24/08* | (2009.01) |
| *H04W 72/0446* | (2023.01) |
| *H04W 72/1263* | (2023.01) |
| *H04W 72/23* | (2023.01) |

(52) U.S. Cl.
CPC ........... *H04W 72/02* (2013.01); *H04W 24/08* (2013.01); *H04W 72/0446* (2013.01); *H04W 72/1263* (2013.01); *H04W 72/23* (2023.01)

(58) Field of Classification Search
CPC . H04W 72/02; H04W 24/08; H04W 72/0446; H04W 72/1263; H04W 72/23; H04W 28/18; H04L 5/0048
See application file for complete search history.

(56) References Cited

U.S. PATENT DOCUMENTS

| | | | | |
|---|---|---|---|---|
| 2020/0146034 A1* | 5/2020 | Bagheri | ............ | H04W 72/1268 |
| 2023/0318686 A1* | 10/2023 | Kwak | .................... | H04B 7/088 |
| | | | | 455/101 |
| 2024/0040587 A1* | 2/2024 | Rastegardoost | .... | H04W 72/232 |

OTHER PUBLICATIONS

3GPP TS 138.214, 5G; Physical layer procedures for data, V16.2.0 (Jul. 2020) (Year: 2020).*

* cited by examiner

*Primary Examiner* — Jung H Park
(74) *Attorney, Agent, or Firm* — Dinsmore & Shohl LLP

(57) ABSTRACT

Certain aspects of the present disclosure provide a method for wireless communication, including: receiving a capability report from a user equipment defining at least a first processing timeline and a second processing timeline for the user equipment; transmitting data to the user equipment for processing by the user equipment; and processing an acknowledgement from the user equipment in accordance with one of the first processing timeline or second processing timeline for the user equipment defined in the capability report.

28 Claims, 10 Drawing Sheets

410

420

700

A METHOD FOR ADAPTING PROCESSING TIMELINES
BY A USER EQUIPMENT

710

SELECT ONE OF A FIRST PROCESSING TIMELINE OR A SECOND
PROCESSING TIMELINE BASED ON ONE OF: A MONITORING
CONDITION; A SCHEDULING CONDITION; OR A SIGNALING RECEIVED
FROM A BASE STATION

720

PROCESS DATA ACCORDING TO THE SELECTED ONE OF THE FIRST
PROCESSING TIMELINE OR A SECOND PROCESSING TIMELINE

800

A METHOD FOR ADAPTING PROCESSING TIMELINES
BY A NETWORK ENTITY

810

DETERMINE A PROCESSING TIMELINE FOR A USER EQUIPMENT

820

PROCESS DATA FROM USER EQUIPMENT ACCORDING TO
DETERMINED PROCESSING TIMELINE

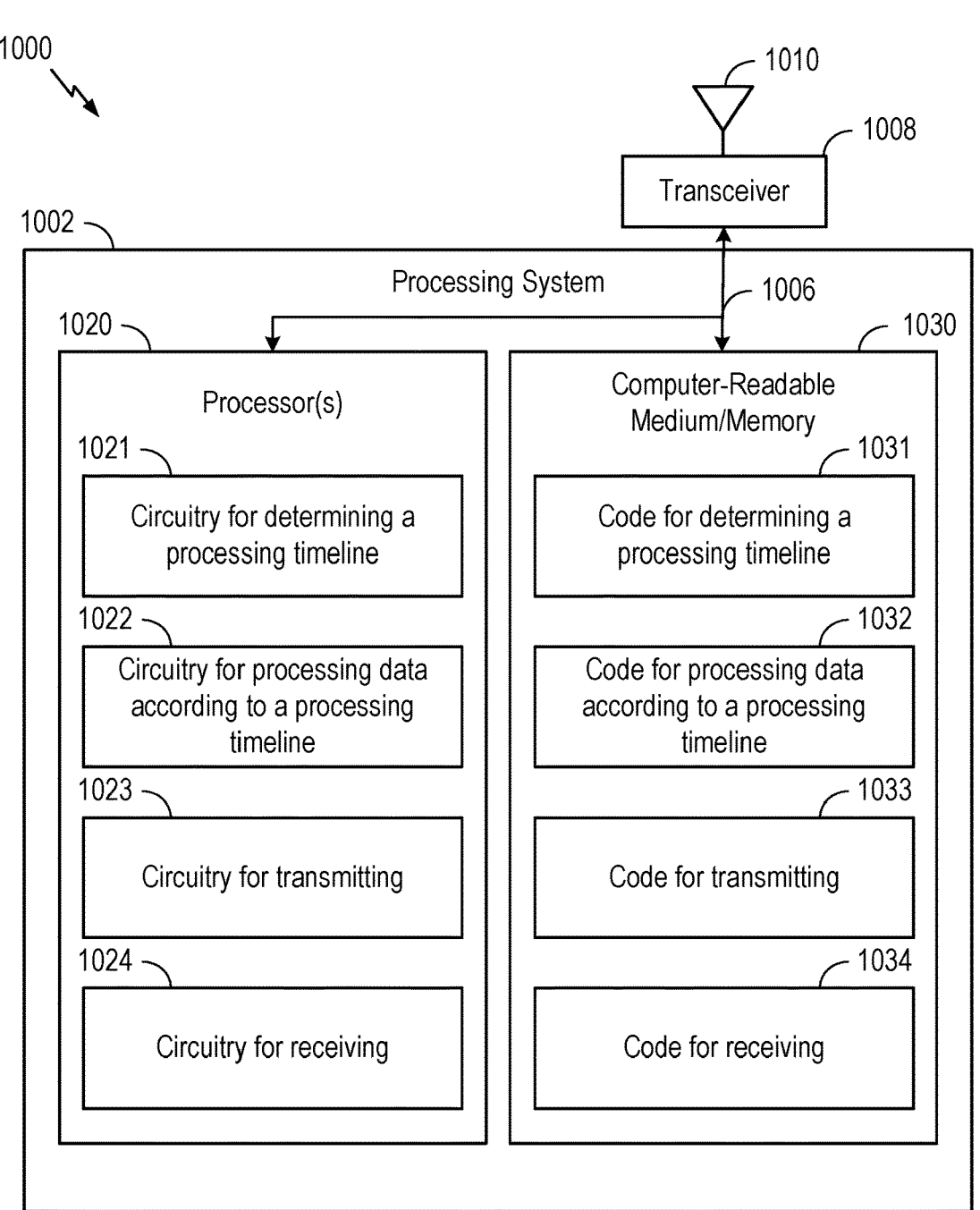

1000

1010

1008

Transceiver

1002

Processing System

1006

1020

Processor(s)

1030

Computer-Readable
Medium/Memory

1021

Circuitry for determining a
processing timeline

1031

Code for determining a
processing timeline

1022

Circuitry for processing data
according to a processing
timeline

1032

Code for processing data
according to a processing
timeline

1023

Circuitry for transmitting

1033

Code for transmitting

1024

Circuitry for receiving

1034

Code for receiving

*FIG. 10*

ADAPTATION OF PROCESSING TIMELINES FOR HIGH FREQUENCY BANDS

CROSS-REFERENCE TO RELATED APPLICATIONS

This application claims the benefit of and priority to U.S. Provisional Patent Application No. 63/170,929, filed on Apr. 5, 2021, the entire contents of which are incorporated herein by reference.

INTRODUCTION

Aspects of the present disclosure relate to wireless communications, and more particularly, to techniques for adapting processing timelines for high-frequency wireless communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment, comprising: selecting one of a first processing timeline or a second processing timeline based on one of: a monitoring condition; a scheduling condition; or a signaling received from a base station; and processing data according to the selected one of the first processing timeline or a second processing timeline.

Another aspect provides a method for wireless communication, comprising: determining a processing timeline for a user equipment; and processing data from the user equipment according to the determined timeline.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 10 depicts aspects of another example communications device.

DETAILED DESCRIPTION

Aspects of the present disclosure provide apparatuses, methods, processing systems, and computer-readable mediums for adapting processing timelines for high-frequency wireless communications.

One of the many benefits of fifth generation (5G) "new radio" (NR) wireless communication systems is the introduction of higher frequency bands for communications. Higher frequency bands allow for higher data rates in wireless communications.

For 5G communications with higher carrier frequencies (e.g., 52.6 GHz-114.25 GHz in so-called Frequency Range 4 (FR4)), OFDM waveforms with larger subcarrier spacing (e.g., 240 kHz-1.92 MHz) are used to combat phase noise. A consequence of the larger subcarrier spacing is that the slot length tends to be very short. This is because a slot is defined as a fixed number of OFDM symbols, thus a higher subcarrier spacing leads to a shorter slot duration and a shorter cyclic prefix.

Figure 4A:
FIGS. 4A and 4B depict various aspects of slots in high-frequency communications.
Figure 4A:
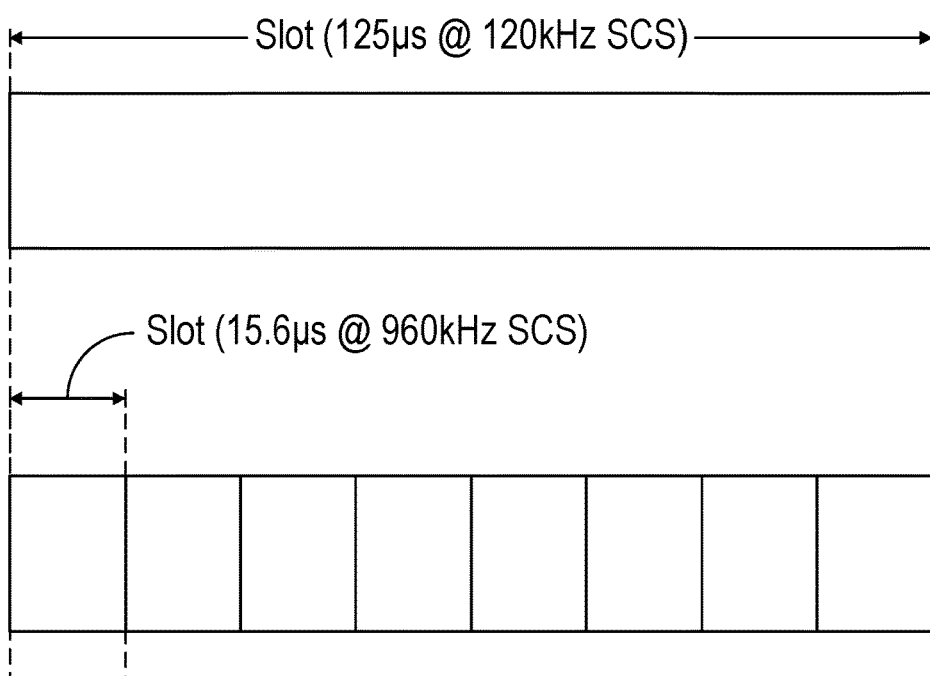

By way of example, for 5G wireless communications in the 24.25 GHz-52.6 GHz bands (known as FR2) using 120 kHz subcarrier spacing, the slot length is generally 125 $\mu$Sec, while in FR4 with 960 kHz subcarrier spacing, the slot length is 15.6 $\mu$Sec. FIG. 4A depicts an example 410 of the relative differences in slot sizes based on these two configurations. This significant reduction in slot length can pose certain challenges to device design and implementation for high-frequency communications.

For example, due to implementation complexity, a device's processing timeline (e.g., for control and data processing) may not proportionally scale with the slot length as the frequency increases. Thus, certain advantageous features that can be implemented with relatively longer slot lengths at lower frequencies may no longer be available with extremely short slot lengths at higher frequencies.

One such example is the power saving benefit of microsleep, which is compatible using FR1 (410 MHz-7.125 GHz) and FR2 (24.25 GHz-52.6 GHz) bands, but may not be compatible in FR4 where control channel processing may be comparable to or even overrun the slot length.

Figure 4B:
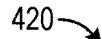
Figure 4B:
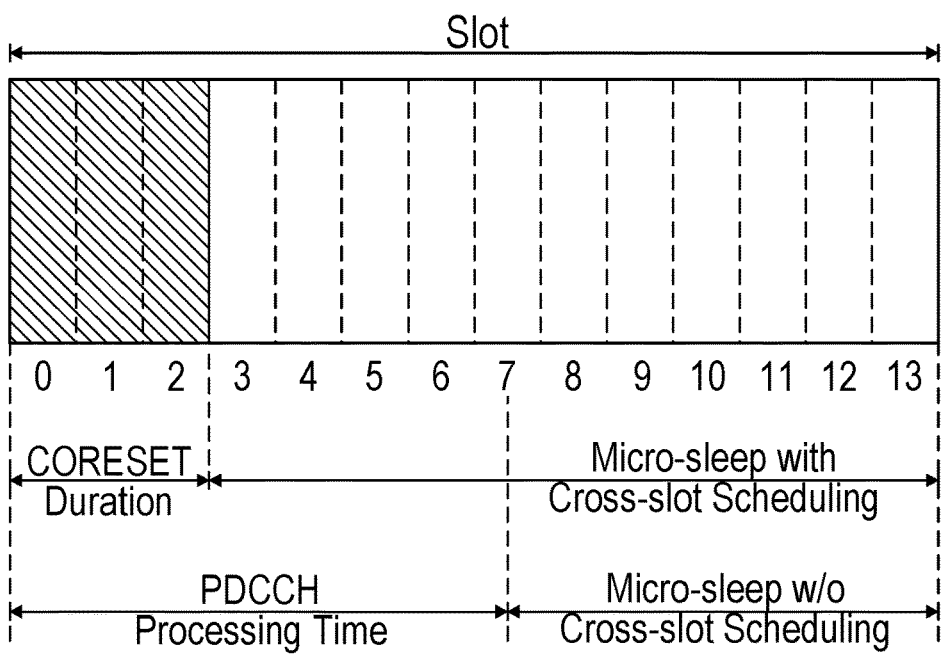

For example, with reference to the example 420 depicted in FIG. 4B, consider that if the slot length decreases, but the physical downlink control channel (PDCCH) processing time does not decrease, or at least does not decrease proportionally with the slot length, that it is possible for a PDCCH processing timeline to exceed an entire slot length. As depicted in FIG. 4A, higher frequency bands with larger subcarrier spacing can significantly decrease the slot length due to the need for higher subcarrier spacing.

As another example, when using FR1 and FR2 bands for communications, a user equipment may be configured to monitor control signaling (e.g., PDCCH) in every slot. However, when using FR4, the minimum PDCCH monitoring periodicity may exceed one slot due to disproportionate scaling of slot time versus processing time at higher frequencies.

Figure 5:
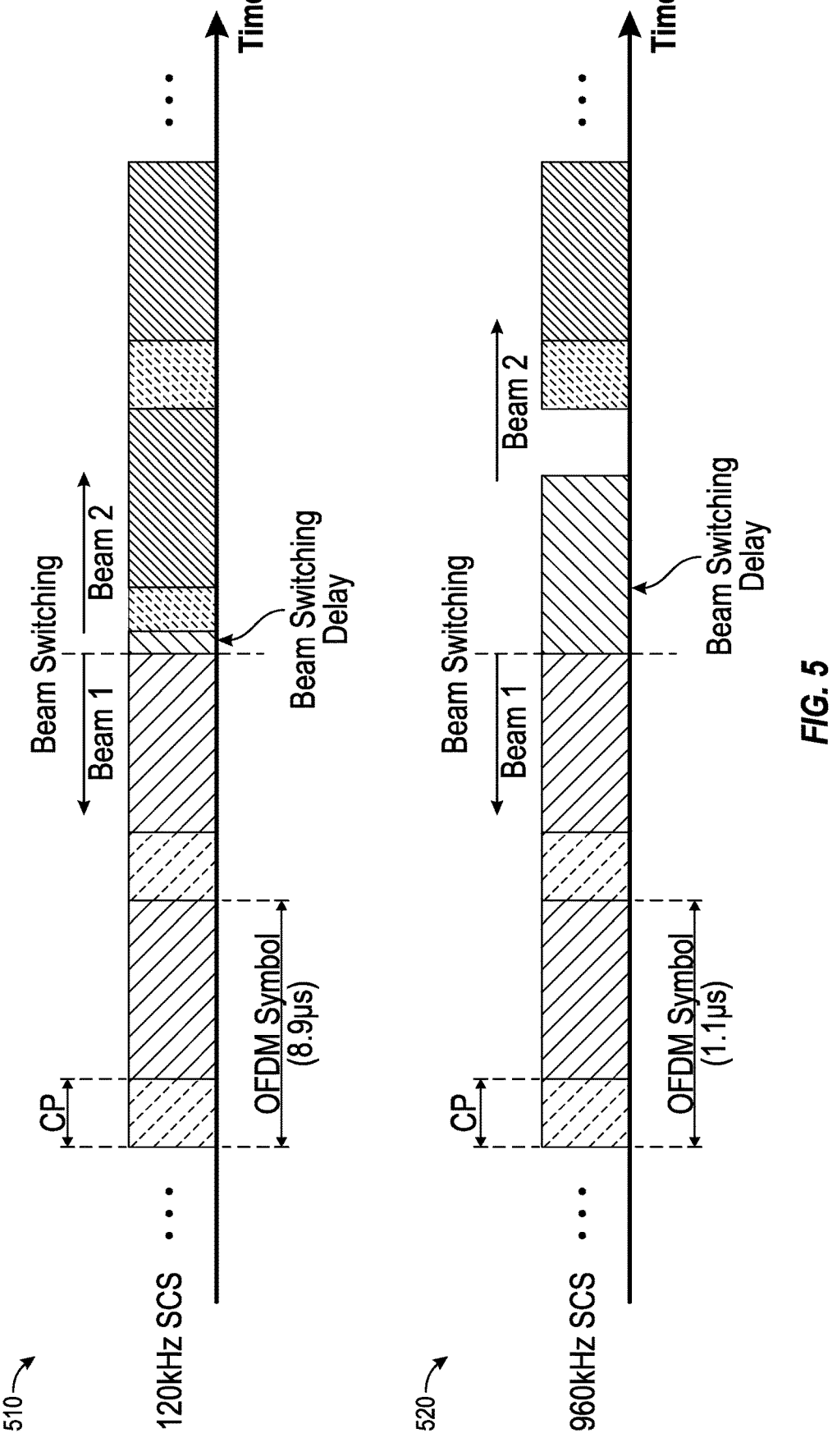
FIG. 5 depicts example aspects of processing timelines for different subcarrier spacings.

As yet another example, FR4 band communications may generally require more frequent RF re-tuning compared to FR1 and FR2, which result in higher overhead in FR4 compared to FR1 and FR2. For example, as depicted in FIG. 5 with respect to timeline 510, in FR2 with 120 kHz subcarrier spacing, the analog beam switching delay can be contained within a cyclic prefix (CP) duration (e.g., 584 ns). However, in FR4 with 960 kHz subcarrier spacing, the nominal CP duration is 73 ns. Consequently, additional beam switching time (e.g., measured in an integer number of OFDM symbols) may be required, which delays the onset of beam 2 from beam 1, as shown in timeline 520.

As yet another example, when using an FR2 band for communications with 120 kHz subcarrier spacing, time division duplex (TDD) link direction changes (e.g., from downlink (DL) to uplink (UL), or vice versa) can generally be accomplished within 2 OFDM symbols. However, when using FR4 with 960 kHz subcarrier spacing, it may require a larger number of symbols for TDD link direction changes.

To address the aforementioned challenges when using high-frequency communications, such as in FR4, multi-slot control signal (e.g., PDCCH) monitoring and multi-transmission time interval (TTI) downlink and uplink may be implemented. That is, a user equipment may be configured to switch between per-slot control channel monitoring and multi-slot control channel monitoring, as well as between single-slot DL/UL scheduling and multi-slot DL/UL scheduling. This switching can generally be semi-static or dynamic. However, because these methods may add latency, it is beneficial to only configure such monitoring and scheduling regimes when a user equipment is actually capable of and configured to use high-frequency communications.

For example, the periodicity of a control channel (e.g., PDCCH) monitoring occasion may be enabled to be larger than one slot based on a UE's capability and configuration for high-frequency communications. In such cases, a single PDCCH, for example, may be configured to schedule physical downlink shared channel (PDSCH) and physical uplink shared channel (PUSCH) transmissions over multiple slots in order to maintain scheduling flexibility.

In some cases, a user equipment's processing timeline may depend on the mode of control channel monitoring and/or downlink and uplink scheduling (i.e., single-slot vs multi-slot). For example, if a user equipment is scheduled with multiple PDSCHs over multiple TTIs (e.g., slots or mini-slots), a longer processing timeline may be required, such as the processing timeline between the end of the last PDSCHs of the multiple PDSCSHs and the associated HARQ-ACK feedback.

Aspects described herein therefore relate to dynamic processing timeline adaptation in which a user equipment may select and apply (and a base station may configure) different processing timelines depending on conditions and/or signaling between the user equipment and the base station. For example, in various aspects, selecting one of a plurality of possible processing timeline may be based on a monitoring condition (e.g., per-slot or multi-slot control channel monitoring), a scheduling condition (e.g., single-TTI or multi-TTI uplink and downlink scheduling); an explicit signaling received from the network; or a signaling related to a monitoring or scheduling condition, to name a few examples. Selecting different processing timelines based on conditions and signaling between the user equipment and network (e.g., base station) beneficially allows for utilizing higher frequency communications while mitigating the challenges of high-frequency communications processing described above.

Aspects described herein thus provide a technical solution to the technical problems associated with higher frequency communications that require larger subcarrier spacing. Beneficially, the aspects described herein enable improved performance in wireless communications using higher frequency bands, such as FR4 and others. The ability to use these higher frequency with adaptive processing timelines enables higher performance wireless communications that, for example, achieve higher data rates, lower latency, and more efficient use of the spectrum.

Introduction to Wireless Communication Networks

Figure 1:
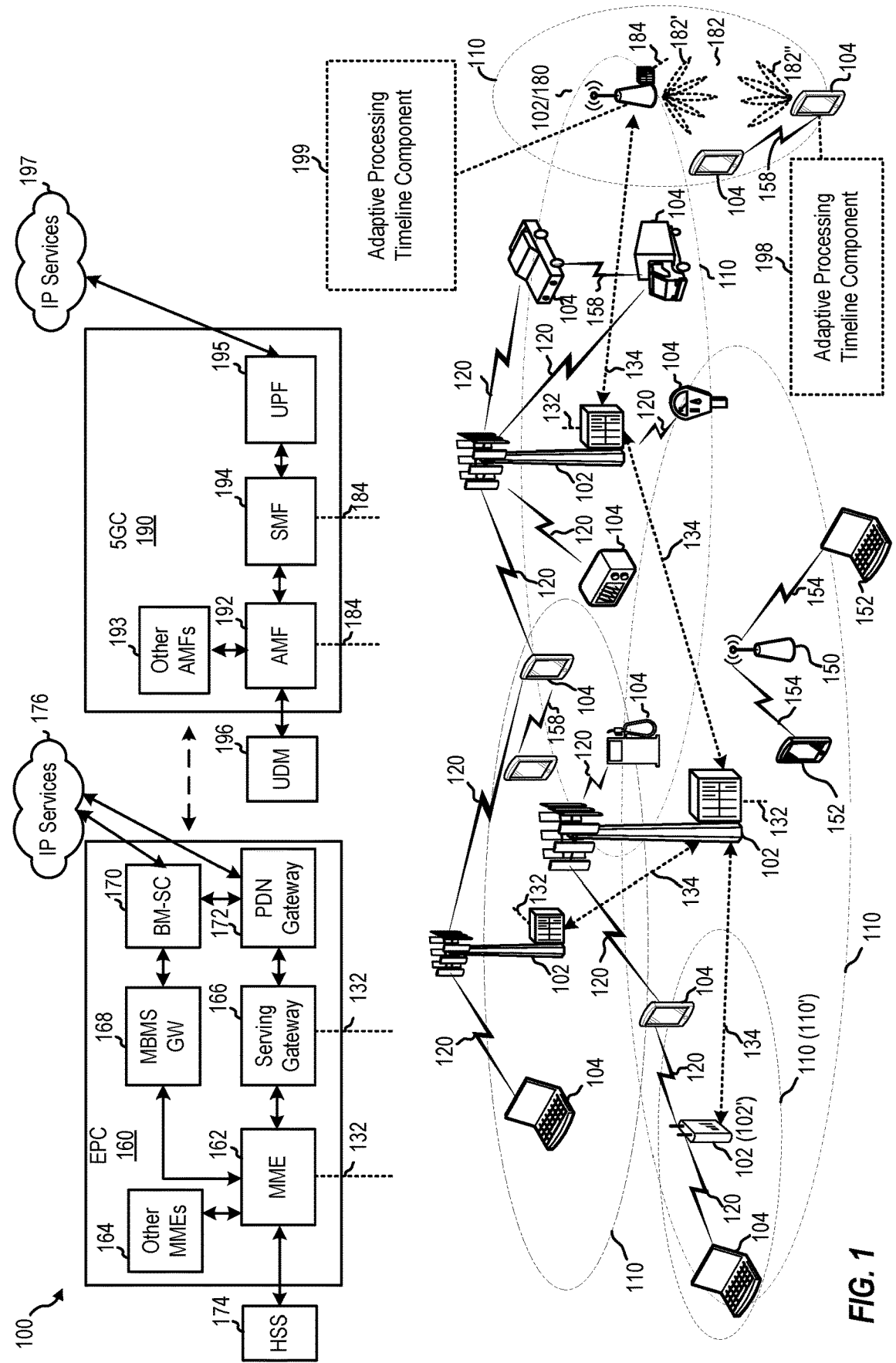
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes an adaptive processing timeline component 199, which may be configured to coordinate adaptive processing timelines with a user equipment when using, for example, higher-frequency bands for wireless communications. Wireless network 100 further includes adaptive processing timeline component 198, which may be used configured to adapt processing timelines at the user equipment 104 based on conditions, configurations, and signaling from the network, such as from a base station 102 or 180.

Figure 2:
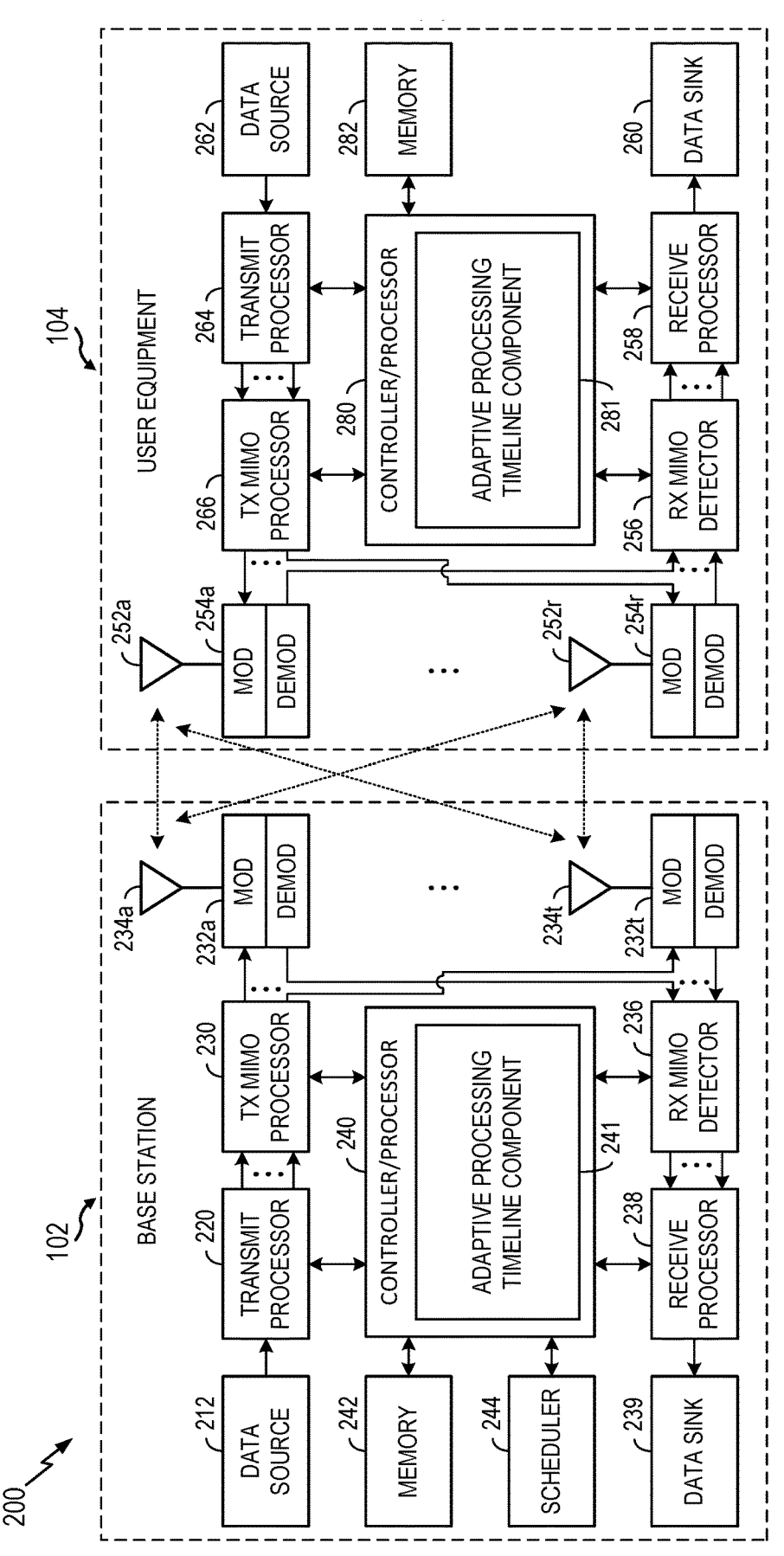
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes adaptive processing timeline component 241, which may be representative of adaptive processing timeline component 199 of FIG. 1. Notably, while depicted as an aspect of controller/processor 240, adaptive processing timeline component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes adaptive processing timeline component 281, which may be representative of adaptive processing timeline component 198 of FIG. 1. Notably, while depicted as an aspect of controller/processor 280, adaptive processing timeline component 281 may be implemented additionally or alternatively in various other aspects of user equipment 104 in other implementations.

Figures 3A, 3B, 3C, 3D:
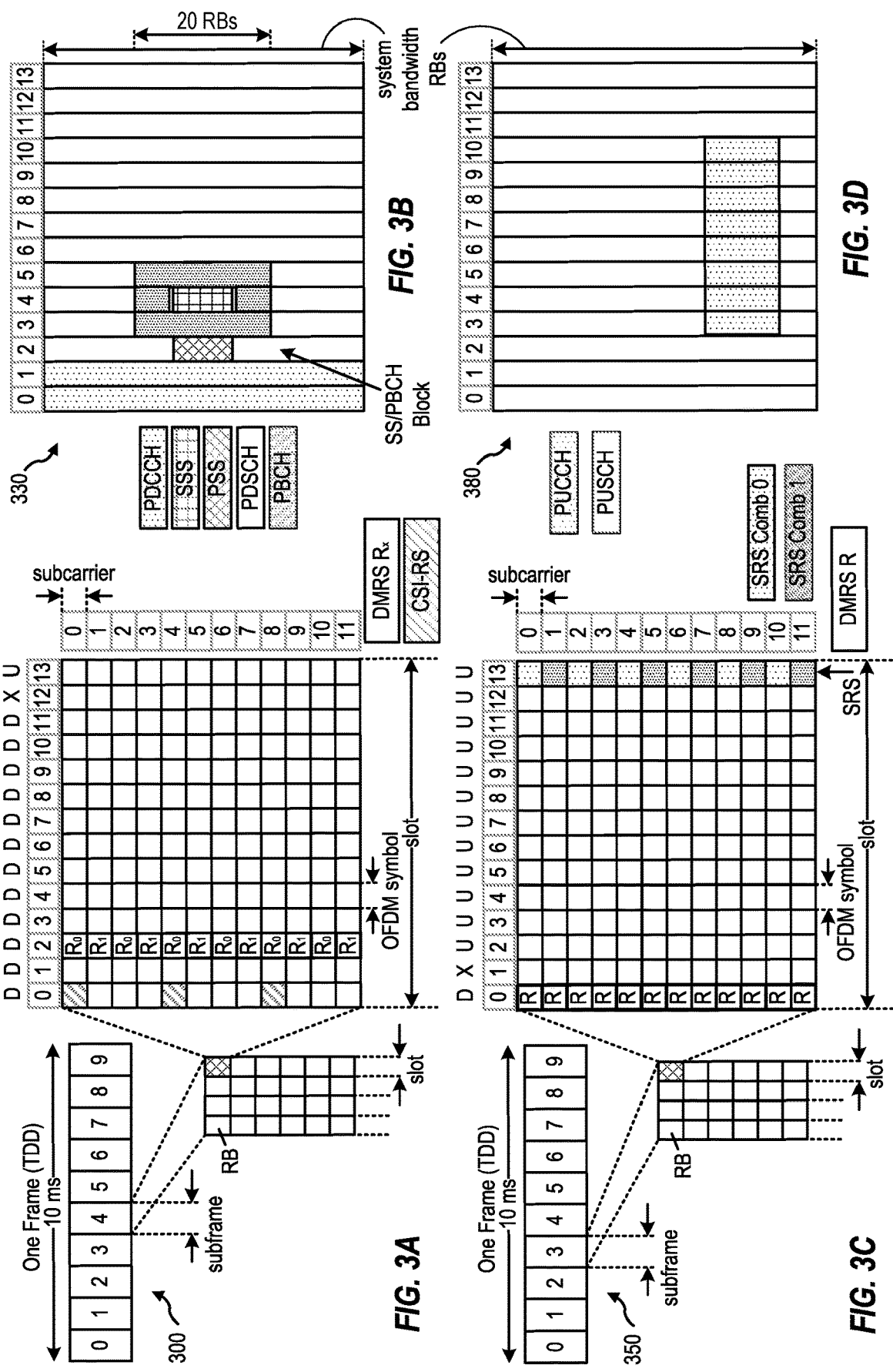
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. EHF includes FR4, which includes 52.6 GHz-114.25 GHz bands. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beam-formed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

As described herein, dynamic processing timeline adaptation may be implemented to enable communications using higher-frequency bands, including mmWave bands in FR4.

Aspects Related to Adapting Processing Timelines for High Frequency Wireless Communications Aspects described herein relate to dynamic processing timeline adaptation in which a user equipment may select (and a base station may configure) different processing timelines depending on conditions and/or signaling between the user equipment and the base station.

Processing timelines, as described herein, may broadly refer to various types of control and data processing. For example, PDSCH processing timelines and PUSCH prepa-ration timelines are generally described in Section 5.3 and 6.4, respectively, of the 3GPP technical specification (TS) 38.214. As an example, an "N1" timeline determines the minimum time interval between a PDSCH and an associated HARQ-ACK feedback.

As an example of a condition (or configuration) that may be used to determine a processing timeline, a user equipment may be configured with per-slot control channel monitoring (e.g., PDCCH monitoring) or multi-slot control channel monitoring. In various aspects, if the user equipment is configured or operating with per-slot control channel moni-toring (e.g., a first condition or configuration), then a first processing timeline is applied. In the alternative, if the user equipment is configured or operating with multi-slot control channel monitoring (e.g., a second condition or configura-tion), then a second processing timeline is applied, where the second processing timeline is different than the first pro-cessing timeline (e.g., the second processing timeline may be longer than the first processing timeline).

In the case of multi-slot control channel monitoring, a processing timeline may further be differentiated based on the configured periodicity of control channel monitoring occasions. For example, where the periodicity of multi-slot control channel monitoring is shorter, the processing time-line may be shorter, and vice versa.

As an example of signaling that may be used to determine a processing timeline, when a user equipment is configured with multi-TTI DL/UL scheduling, the user equipment may determine the number of scheduled TTIs (e.g., PDSCHs/PUSCHs) based on scheduling DCI (signaling), such as DCI field value(s), DCI format(s), monitoring occasions, and the like. For example, if the scheduling DCI indicates N TTIs, then the processing timeline may be based on the value of N. For example, if N is less than or equal to a certain threshold (e.g., 1), a first processing timeline is applied, otherwise, a second processing timeline is applied, where the second processing timeline is longer than the first processing time-line.

In order to enable the adaptive processing timelines, a user equipment may report a plurality of configured or possible processing timelines to the network, such as in a user equipment capability report. The processing timelines may generally be defined by one or more processing param-eters, which may be reported in one or more tables in some examples. Examples of processing parameters that may be associated with a processing timeline, include: a physical downlink shared channel (PDSCH) processing time; a physical uplink shared channel (PUSCH) preparation time; a physical downlink control channel (PDCCH) processing time; a downlink or uplink scheduling offset; a channel state information (CSI) processing time; a beam switching delay (e.g., for bandwidth part (BWP) switching); and a radio frequency retuning delay, to name a few, but others are possible.

A user equipment may further include conditions (or configurations) that correspond with the configured process-ing timelines when reporting its processing timelines to the network. In this way, the network and the user equipment have a shared understanding and expectation with regard to the dynamic application of various processing timelines based on conditions and configurations without explicit signaling.

Further, the network (e.g., a base station communicating with a user equipment) may configure different sets of processing timelines parameters through signaling (e.g., radio resource control (RRC) signaling) associated with the processing timeline, and may thereafter apply a correspond-ing set of parameters to communications depending on a condition or signaling (as with the user equipment).

For example, the network may configure multiple sets of downlink/uplink time domain resource allocation (TDRA) lists corresponding to different conditions or processing timelines. In some examples, the TDRA lists may include parameter values, such as K0, K1, and K2 values. Generally, a K0 value defines an offset between a downlink slot in which a PDCCH downlink control information for downlink scheduling is received and a downlink slot in which PDSCH data is scheduled; a K1 value defines an offset between the downlink slot in which the PDSCH data is scheduled and an uplink slot in which a HARQ-ACK feedback for the PDSCH data needs to be sent; and a K2 value defines an offset between the downlink slot in which the PDCCH downlink control information for downlink scheduling is received and an uplink slot in which uplink data needs to be sent on a PUSCH.

When the network has configured different sets of pro-cessing parameters, the first set may generally be configured to comply with a first processing timeline, and the second set may be configured to comply with the second processing timeline.

Alternatively, the network may configure a single set of parameters and apply some restriction on the applicable values/ranges. For example, if a single set of downlink/ uplink TDRA lists is configured and the first processing timeline is applied, the network and user equipment do not expect any entries of the TDRA lists that do not comply with the first processing timeline to be indicated by a scheduling DCI.

As another example, if the PDCSH processing time of the first processing timeline is N1, then the user equipment does not expect to be indicated with a K1 value (slots) whose length is smaller than N1 value (symbols). Note that these values may be converted to a common time domain (e.g., slots or symbols) prior to comparison.

Figure 6:
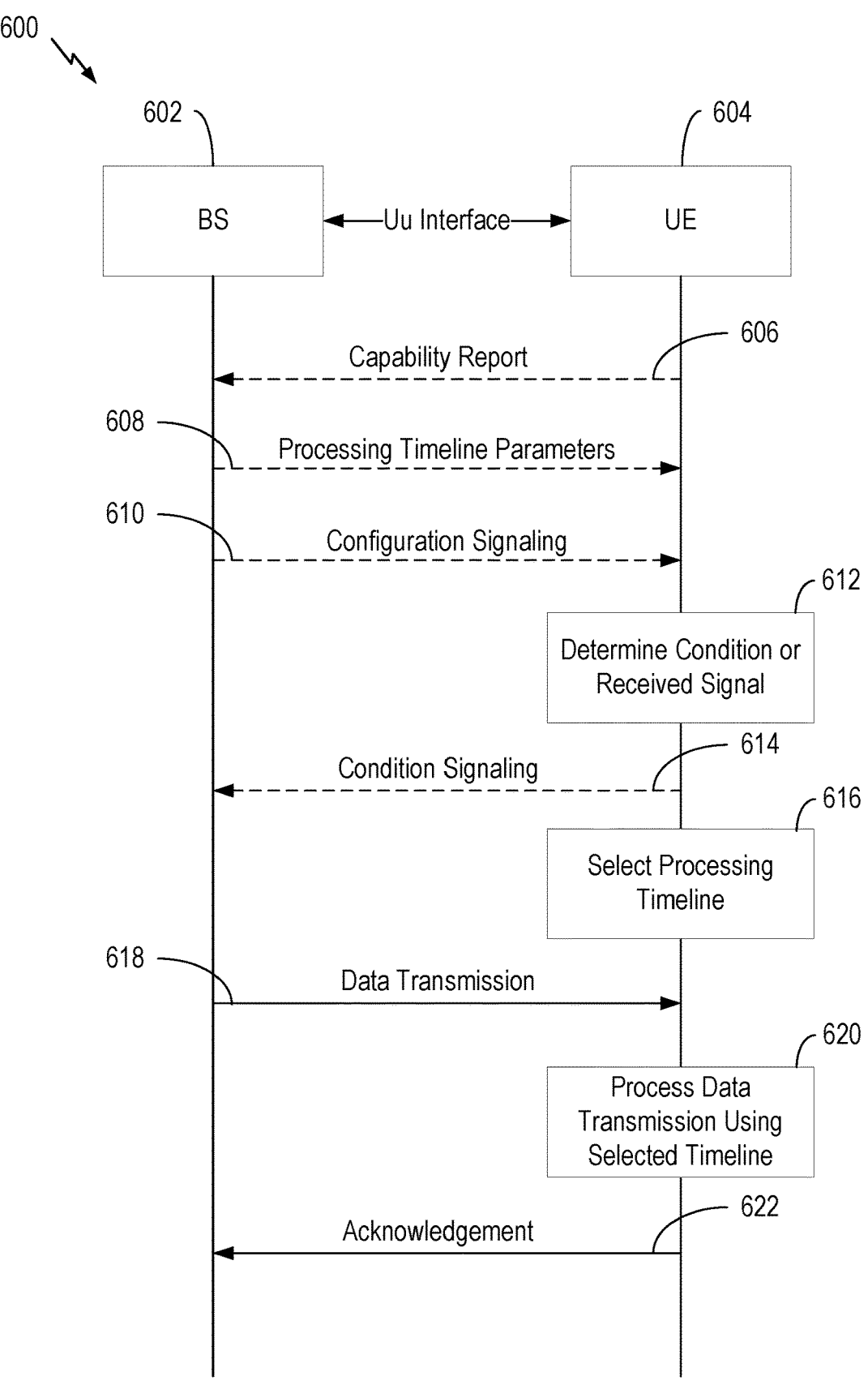
FIG. 6 depicts an example flow between a base station and a user equipment for adaptively configuring processing timelines.

FIG. 6 depicts an example flow 600 between a base station 602 and a user equipment 604 for adaptively configuring processing timelines.

As depicted, base station 602 (e.g., a base station such as 102 in FIGS. 1 and 2) is in data communications with user equipment 604 (e.g., a user equipment such as 104 in FIGS. 1 and 2) via a Uu interface. In this example, base station 602 and user equipment 604 may be conducting high-frequency communications, such as communications in frequency range 4 (FR4), as described above.

At 606, user equipment 604 may optionally transmit a capability report to base station 602. In some aspects, the capability report may define a plurality of processing timelines that user equipment 604 is capable of implementing or applying. In some cases, each processing timeline may be defined in terms of one or more processing parameters, including a physical downlink shared channel (PDSCH) processing time; a physical uplink shared channel (PUSCH) preparation time; a physical downlink control channel (PDCCH) processing time; a downlink or uplink scheduling offset; a channel state information (CSI) processing time; a beam switching delay (e.g., for bandwidth part (BWP) switching); and a radio frequency retuning delay, and others.

In some cases, user equipment 604 may further include conditions (or configurations) that correspond with the processing timelines so that base station 602 has knowledge of when the processing timelines will be applied based on the conditions (or configurations).

At 608, base station 602 may optionally configure user equipment 604 with a plurality of processing timelines, or with parameters related to the processing timelines reported to base station 602, which may include parameters such as those described above (e.g., TDRA lists associated with different processing timelines).

At 610, base station 602 may optionally transmit configuration signaling to user equipment 604. For example, base station 602 may configure multi-slot or per-slot control channel monitoring (e.g., PDCCH), multi-TTI or single-TTI downlink and uplink scheduling, as well as other monitoring and scheduling configurations.

At 612, user equipment 604 determines a condition (or configuration) of its current operation. For example, the condition may relate to monitoring (e.g., per-slot or multi-slot control channel monitoring) or scheduling (e.g., single-TTI or multi-TTI downlink and uplink scheduling). Further, user equipment 604 may determine a received signal at 612, which may include configuration signaling from base station 602, such as an explicit signaling messaging configuring the monitoring or scheduling modes for user equipment 604.

Note that because user equipment 604 may already be operating according to a condition (e.g., monitoring or scheduling), user equipment 604 may therefore determine a condition at 612 without explicit signaling from base station 602.

At 614, user equipment 604 may optionally signal a condition (such as a monitoring or scheduling condition) to base station 602, which base station 602 may use to determine a processing timeline being used by user equipment 604. For example, base station 602 may make this determination based on processing timeline parameters defined in the capability report it receives at 606, or based on its own processing timeline parameters sent at 608.

Based on the user equipment's determination at 612, the user equipment selects a processing timeline at 616. The processing timeline may be selected from a plurality of configured processing timelines, such as those indicated to base station 602 in the capability report at 606, and/or those configured by base station 602 in with processing timeline parameters at 608.

At 618, user equipment 604 receives a data transmission from base station 602. The data transmission at 618 could include control channel data (e.g., PDCCH data), shared channel data (e.g., PDSCH data), or other types of data.

At 620, user equipment 604 processes the received data according to the selected processing timeline (e.g., selected at step 616).

At 622, user equipment 604 transmits an acknowledgement (e.g., a Hybrid Automatic Repeat Request (HARD) acknowledgment) to base station 602. In some cases, the timing of the acknowledgement may be based on the selected processing timeline, and base station 602 may process the acknowledgment based on that timeline.

Example Method for Adapting Processing
Timelines by a User Equipment

Figure 7:
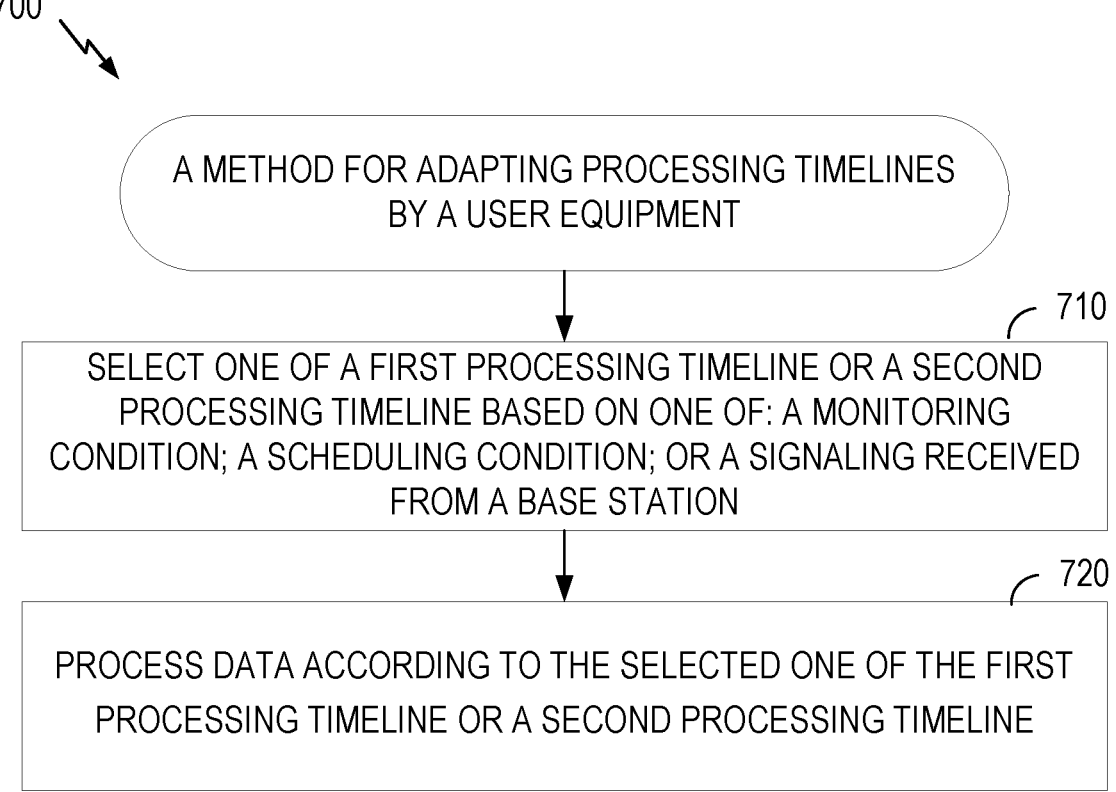
FIG. 7 depicts an example method for wireless communication by a user equipment.

FIG. 7 depicts an example method 700 for wireless communication by a user equipment. In some cases, method 700 may be performed by a user equipment, such as user equipment 104 in FIGS. 1 and 2. In some cases, the adaptive processing timeline component 198 and 281, of FIGS. 1 and 2, respectively, may be configured to perform various aspects of method 700.

Method 700 begins at step 710 with selecting one of a first processing timeline or a second processing timeline based on one of: a monitoring condition; a scheduling condition; or a signaling received from a base station.

Method 700 then proceeds to step 720 with processing data according to the selected one of the first processing timeline or a second processing timeline. Generally, the first processing timeline and the second processing timeline are different. For example, in some cases, the first processing timeline is shorter than the second processing timeline.

In some aspects, method 700 further includes receiving the data from the base station for processing on a high-frequency band, such as an FR4 frequency band.

In some aspects, the first processing timeline is defined by one or more processing parameters and one or more corresponding first processing timeline parameter values for the one or more processing parameters, the second processing timeline are defined by the one or more processing parameters, and one or more corresponding second processing timeline parameter values for the one or more processing parameters, and at least one of the one or more corresponding first processing timeline parameter values is different than a corresponding one of the one or more corresponding second processing timeline parameter values (e.g., a particular parameter has a different parameter value for the first processing timeline than the second processing timeline, such as a different time value).

In some aspects, the one or more processing parameters comprise one or more of: a physical downlink shared channel (PDSCH) processing time; a physical uplink shared channel (PUSCH) preparation time; a physical downlink control channel (PDCCH) processing time; a downlink or uplink scheduling offset; a channel state information (CSI) processing time; a beam switching delay; or a radio frequency retuning delay.

In some aspects, selecting one of the first processing timeline or the second processing timeline is based on a monitoring condition. In such cases, the monitoring condition may comprise a physical downlink control channel (PDCCH) monitoring condition, and the PDCCH monitoring condition determines whether the user equipment is configured or operating in a per-slot PDCCH monitoring mode or a multi-slot PDCCH monitoring mode. In such cases, the user equipment may be configured to select the first processing timeline in the per-slot PDCCH monitoring mode, and the user equipment may be further configured to select the second processing timeline in the multi-slot PDCCH monitoring mode.

In some aspects, the user equipment is configured or operating in a multi-slot PDCCH monitoring mode, and method 700 further includes selecting one of the first processing timeline or the second processing timeline further based on a periodicity of the multi-slot PDCCH monitoring mode.

In some aspects, selecting one of the first processing timeline or the second processing timeline is based on a signaling received from the base station. In such cases, the scheduling condition may comprise a physical downlink shared channel (PDSCH) or physical uplink shared channel (PUSCH) scheduling condition, and the PDSCH or PUSCH scheduling condition determines whether the user equipment is configured or operating in a single transmit time interval (TTI) PDSCH or PUSCH scheduling mode or a multi-TTI PDSCH or PUSCH scheduling mode. In such cases, the user equipment may be configured to select the first processing timeline in the single-TTI PDSCH or PUSCH scheduling mode, and the user equipment may further be configured to select the second processing timeline in the multi-TTI PDSCH or PUSCH scheduling mode.

In some aspects, the user equipment is configured or operating in a multi-TTI PDSCH or PUSCH scheduling mode, and method 700 further includes selecting one of the first processing timeline or the second processing timeline further based on a number of the TTIs associated with the multi-TTI PDSCH or PUSCH scheduling mode.

In some aspects, selecting one of the first processing timeline or the second processing timeline is based on a monitoring condition. In such cases, the signaling received from the base station may determine a transmission time interval configuration for the user equipment. For example, the signaling received from the base station may comprise downlink control information (DCI). In such cases, method 700 may further include determining a number of transmission time intervals for the transmission time interval configuration based on the DCI (e.g., the number of total transmission time intervals that are simultaneously scheduled); and selecting one of the first processing timeline or the second processing timeline further based on whether the number of transmission time intervals exceeds a threshold. In some aspects, method 700 may further include selecting the second processing timeline if the number of transmission time intervals exceeds the threshold; and selecting the first processing timeline if the number of transmission time intervals is less than or equal to the threshold. In some aspects, the threshold is 1.

In some aspects, where the signaling received from the base station comprises DCI, the DCI may include at least one of: a DCI field values indicating the number of transmission time intervals; a DCI format indicating the number of transmission time intervals; or a number of monitoring occasions indicating the number of transmission time intervals.

In some aspects, method 700 may further include sending a capability report to the base station, such as described with respect to 606 of FIG. 6. In various aspects, the capability report defines: the one or more first processing timeline parameter values corresponding to the one or more processing parameters defining the first processing timeline; and the one or more second processing timeline parameter values corresponding to the one or more processing parameters defining the second processing timeline.

In some aspects, method 700 may further include transmitting at least one of the monitoring condition or the scheduling condition to a base station, wherein the at least one of the monitoring condition or the scheduling condition indicates which of the first processing timeline or the second processing timeline is in use by the user equipment.

In some aspects, method 700 may further include receiving the one or more first processing timeline parameter values from the base station via radio resource control signaling; and receiving the one or more second processing timeline parameter values from the base station via radio resource control signaling. In some cases, the one or more first processing timeline parameter values and the one or more second processing timeline parameter values are defined in a plurality of sets of time domain resource allocations (TDRA) lists. In various aspects, each set of TDRA lists of the plurality of sets of TDRA lists comprises at least: a K0 value defining an offset between a downlink slot in which a PDCCH downlink control information for downlink scheduling is received and a downlink slot in which PDSCH data is scheduled; a K1 value defining an offset between the downlink slot in which the PDSCH data is scheduled and an uplink slot in which a HARQ-ACK feedback for the PDSCH data needs to be sent; and a K2 value defining an offset between the downlink slot in which the PDCCH downlink control information for downlink scheduling is received and an uplink slot in which uplink data needs to be sent on a PUSCH.

In some aspects, the one or more first processing timeline parameter values and the one or more second processing timeline parameter values are defined in a single set of time domain resource allocations (TDRA) lists, which may include the aforementioned K0, K1, and K2 values.

In some aspects, K1 is larger than or equal to a minimum offset between a PDSCH data transmission on a downlink and a HARQ-ACK feedback on an uplink, wherein the minimum offset is determined by the one or more processing parameters.

In some aspects, K2 is larger than or equal to a minimum offset between a PDCCH transmission on a downlink and a PUSCH transmission on an uplink, wherein the minimum offset is determined by the one or more processing parameters.

Note that FIG. 7 is just one example of a method, and other methods including fewer, additional, or alternative steps are possible consistent with this disclosure.

Example Method for Adapting Processing
Timelines by a User Equipment

Figure 8:
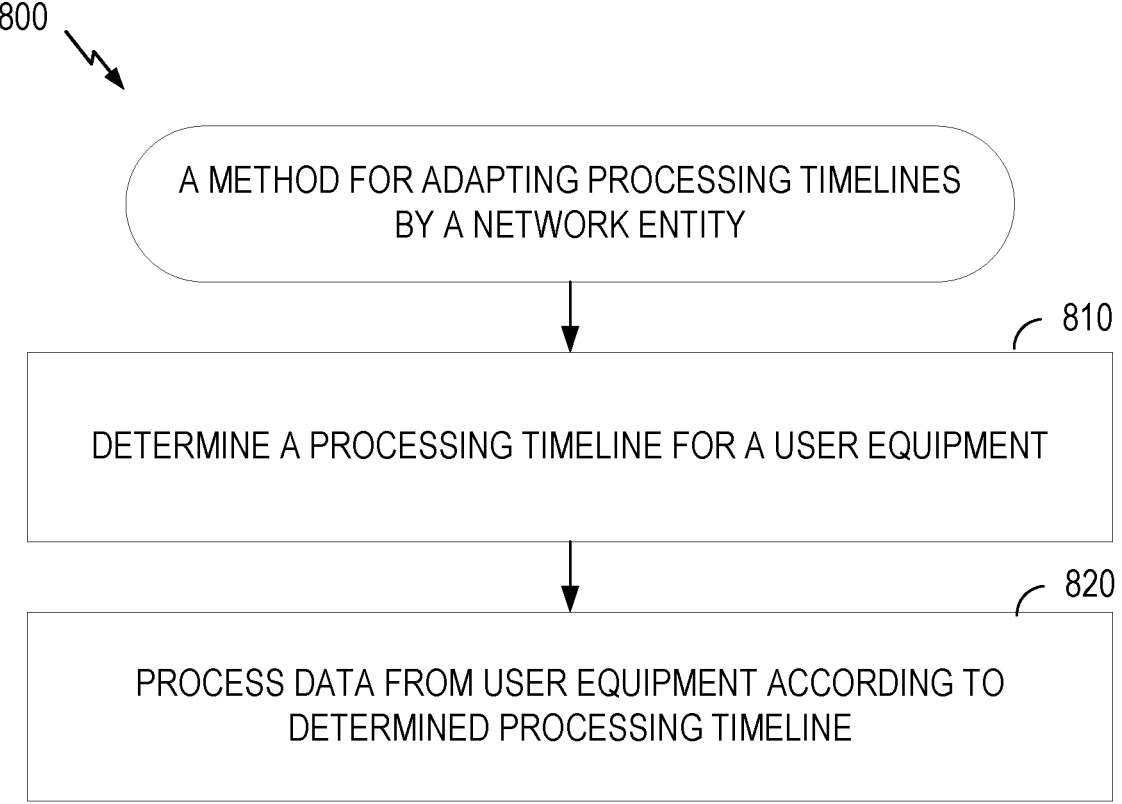
FIG. 8 depicts an example method for wireless communication by a base station.

FIG. 8 depicts an example method 800 for wireless
communication by a network. In some cases, method 800
may be performed by a network entity, such as base station
102 in FIGS. 1 and 2. In some cases, the adaptive processing
timeline component 199 and 241, of FIGS. 1 and 2, respec-
tively, may be configured to perform various aspects of
method 800.

Method 800 begins at step 810 with determining a pro-
cessing timeline for a user equipment.

Method 800 then proceeds to step 820 with processing
data from the user equipment according to the determined
timeline.

In some aspects, determining a processing timeline for the
user equipment comprises one of: receiving a capability
report from a user equipment defining at least a first pro-
cessing timeline and a second processing timeline for the
user equipment; or transmitting a processing timeline con-
figuration to the user equipment defining at least the first
processing timeline and the second processing timeline for
the user equipment.

In some aspects, the first processing timeline is defined by
one or more processing parameters and one or more corre-
sponding first processing timeline parameter values for the
one or more processing parameters, the second processing
timeline are defined by the one or more processing param-
eters, and one or more corresponding second processing
timeline parameter values for the one or more processing
parameters, at least one of the one or more corresponding
first processing timeline parameter values is different than a
corresponding one of the one or more corresponding second
processing timeline parameter values, and the first process-
ing timeline is shorter than the second processing timeline.

In some aspects, method 800 further includes transmitting
to the user equipment one or more values corresponding to
one or more of the first processing timeline parameter values
and the second processing timeline parameter values in the
processing timeline configuration.

In some aspects, method 800 further includes transmitting
to the user equipment the one or more values in radio
resource control (RRC) signaling.

In some aspects, the one or more values are defined in a
plurality of sets of time domain resource allocations
(TDRA) lists. For example, each set of TDRA lists of the
plurality of sets of TDRA lists comprises at least: a K0 value
defining an offset between a downlink slot in which a
PDCCH downlink control information for downlink sched-
uling is received and a downlink slot in which PDSCH data
is scheduled; a K1 value defining an offset between the
downlink slot in which the PDSCH data is scheduled and an
uplink slot in which a HARQ-ACK feedback for the PDSCH
data needs to be sent; and a K2 value defining an offset
between the downlink slot in which the PDCCH downlink
control information for downlink scheduling is received and
an uplink slot in which uplink data needs to be sent on a
PUSCH.

In some aspects, the one or more values are defined in a
single set of time domain resource allocations (TDRA) lists,
which may include the aforementioned parameters for K0,
K1, and K2.

In some aspects, K1 is larger than or equal to a minimum
offset between a PDSCH data transmission on a downlink
and a HARQ-ACK feedback on an uplink, wherein the
minimum offset is determined by the one or more processing
parameters.

In some aspects, K2 is larger than or equal to a minimum
offset between a PDCCH transmission on a downlink and a
PUSCH transmission on an uplink, wherein the minimum
offset is determined by the one or more processing param-
eters.

In some aspects, method 800 further includes transmitting
signaling to the user equipment configured to configure a
transmission time interval for the user equipment.

In some aspects, the signaling transmitted to the user
equipment comprises downlink control information (DCI)
configured to be used by the user equipment to: determine a
number of transmission time intervals for the transmission
time interval configuration based on the DCI; and select one
of the first processing timeline or the second processing
timeline further based on whether the number of transmis-
sion time intervals exceeds a threshold. In some cases, the
threshold is 1.

In some aspects, method 800 further includes receiving at
least one of a monitoring condition or a scheduling condition
from the user equipment, wherein the at least one of the
monitoring condition or the scheduling condition indicates
which of the first processing timeline or the second process-
ing timeline is in use by the user equipment.

In some aspects, method 800 further includes transmitting
configuration signaling to the user equipment, wherein the
configuration signaling is configured to cause the user
equipment to enter one or more of a monitoring mode or a
scheduling mode.

In some aspects, method 800 further includes determining
that the user equipment is operating in one of the first
processing timeline or second processing timeline based on
the configuration signaling.

In some aspects, method 800 further includes transmitting
data to the user equipment for processing by the user
equipment, wherein processing data from the user equip-
ment according to the determined timeline comprises pro-
cessing an acknowledgement from the user equipment in
accordance with one of the first processing timeline or
second processing timeline for the user equipment defined in
the capability report.

Note that FIG. 8 is just one example of a method, and
other methods including fewer, additional, or alternative
steps are possible consistent with this disclosure.

Example Wireless Communication Devices

Figure 9:
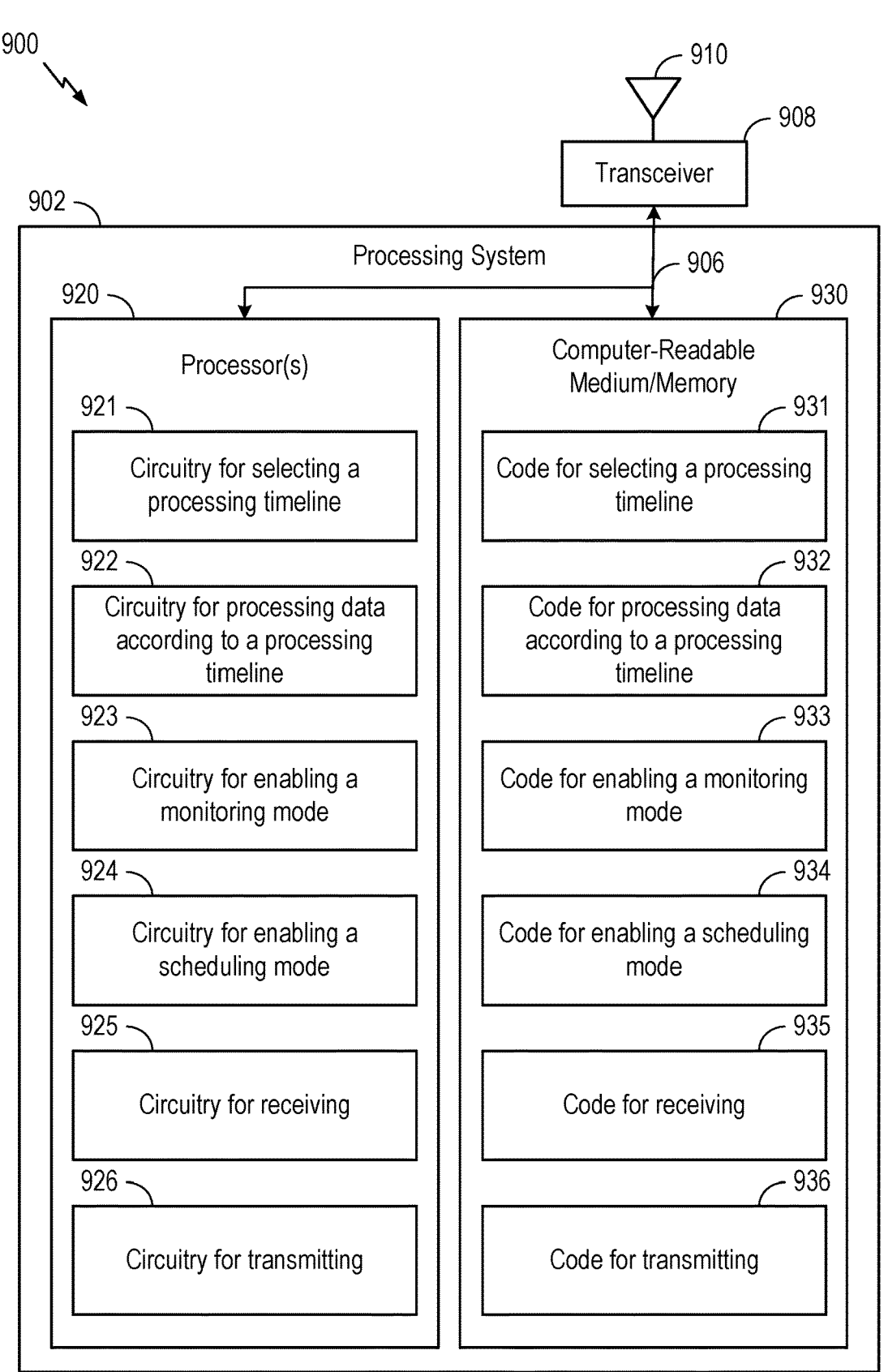
FIG. 9 depicts aspects of an example communications device.

FIG. 9 depicts an example communications device 900
that includes various components operable, configured, or
adapted to perform operations for the techniques disclosed
herein, such as the operations depicted and described with
respect to FIGS. 6-7. In some examples, communication
device 900 may be a user equipment 104 as described, for
example with respect to FIGS. 1 and 2.

Communications device 900 includes a processing system
902 coupled to a transceiver 908 (e.g., a transmitter and/or
a receiver). Transceiver 908 is configured to transmit (or
send) and receive signals for the communications device 900
via an antenna 910, such as the various signals as described
herein. Processing system 902 may be configured to perform
processing functions for communications device 900,
including processing signals received and/or to be transmit-
ted by communications device 900.

Processing system 902 includes one or more processors
920 coupled to a computer-readable medium/memory 920
via a bus 906. In certain aspects, computer-readable
medium/memory 920 is configured to store instructions
(e.g., computer-executable code) that when executed by the one or more processors 920, cause the one or more processors 920 to perform the operations illustrated in FIGS. 6-7, or other operations for performing the various techniques discussed herein for dynamically adapting processing timelines.

In the depicted example, computer-readable medium/memory 930 stores: code 931 for selecting a processing timeline; code 932 for processing data according to a processing timeline; code 933 for enabling a monitoring mode; code 934 for enabling a scheduling mode; code 935 for receiving; and code 936 for transmitting.

In the depicted example, the one or more processors 920 include: circuitry 921 for selecting a processing timeline; circuitry 922 for processing data according to a processing timeline; circuitry 923 for enabling a monitoring mode; circuitry 924 for enabling a scheduling mode; circuitry 925 for receiving; and circuitry 926 for transmitting.

Various components of communications device 900 may provide means for performing the methods described herein, including with respect to FIGS. 6-7.

In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for performing method 700 may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including adaptive processing timeline component 281).

Notably, FIG. 9 is just one example, and many other examples and configurations of communication device 900 are possible.

FIG. 10 depicts an example communications device 1000 that includes various components operable, configured, or adapted to perform operations for the techniques disclosed herein, such as the operations depicted and described with respect to FIGS. 6 and 8. In some examples, communication device 1000 may be a base station 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1020 via a bus 1006. In certain aspects, computer-readable medium/memory 1020 is configured to store instructions (e.g., computer-executable code) that when executed by the one or more processors 1020, cause the one or more processors 1020 to perform the operations illustrated in FIGS. 6 and 8, or other operations for performing the various techniques discussed herein for dynamically adapting processing timelines.

In the depicted example, computer-readable medium/memory 1030 stores: code 1031 for determining a processing timeline; code 1032 for processing data according to a processing timeline; code 1033 for transmitting; and code 1034 for receiving.

In the depicted example, the one or more processors 1020 include: circuitry 1021 for determining a processing timeline; circuitry 1022 for processing data according to a processing timeline; circuitry 1023 for transmitting; and circuitry 1024 for receiving.

Various components of communications device 1000 may provide means for performing the methods described herein, including with respect to FIGS. 6 and 8.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna (s) 234 of the base station illustrated in FIG. 2 and/or transceiver 1008 and antenna 1010 of the communication device 1000 in FIG. 10.

In some examples, means for performing method 800 may include various processing system components, such as: the one or more processors 1020 in FIG. 10, or aspects of the base station 102 depicted in FIG. 2, including receive processor 238, transmit processor 220, TX MIMO processor 230, and/or controller/processor 240 (including adaptive processing timeline component 241).

Notably, FIG. 10 is just one example, and many other examples and configurations of communication device 1000 are possible.

Example Clauses

Implementation examples are described in the following numbered clauses:

Clause 1: A method of wireless communication by a user equipment, comprising: selecting one of a first processing timeline or a second processing timeline based on one of: a monitoring condition; a scheduling condition; or a signaling received from a base station; and processing data according to the selected one of the first processing timeline or the second processing timeline.

Clause 2: The method of Clause 1, wherein: the first processing timeline is defined by one or more processing parameters and one or more corresponding first processing timeline parameter values for the one or more processing parameters, the second processing timeline are defined by the one or more processing parameters, and one or more corresponding second processing timeline parameter values for the one or more processing parameters, at least one of the one or more corresponding first processing timeline parameter values is different than a corresponding one of the one or more corresponding second processing timeline parameter values, and the first processing timeline is shorter than the second processing timeline.

Clause 3: The method of Clause 2, wherein the one or more processing parameters comprise one or more of: a physical downlink shared channel (PDSCH) processing time; a physical uplink shared channel (PUSCH) preparation time; a physical downlink control channel (PDCCH) processing time; a downlink or uplink scheduling offset; a channel state information (CSI) processing time; a beam switching delay; or a radio frequency retuning delay.

Clause 4: The method of Clause 2, wherein selecting one of the first processing timeline or the second processing timeline is based on a monitoring condition, and the monitoring condition comprises a physical downlink control channel (PDCCH) monitoring condition.

Clause 5: The method of Clause 4, wherein: the PDCCH monitoring condition determines whether the user equipment is configured or operating in a per-slot PDCCH monitoring mode or a multi-slot PDCCH monitoring mode, the user equipment is configured to select the first processing timeline in the per-slot PDCCH monitoring mode, and the user equipment is configured to select the second processing timeline in the multi-slot PDCCH monitoring mode.

Clause 6: The method of Clause 5, wherein: the user equipment is configured or operating in a multi-slot PDCCH monitoring mode, and the method further comprises selecting one of the first processing timeline or the second processing timeline further based on a periodicity of the multi-slot PDCCH monitoring mode.

Clause 7: The method of Clause 2, wherein selecting one of the first processing timeline or the second processing timeline is based on a signaling received from the base station, and the scheduling condition comprises a physical downlink shared channel (PDSCH) or physical uplink shared channel (PUSCH) scheduling condition.

Clause 8: The method of Clause 7, wherein: the PDSCH or PUSCH scheduling condition determines whether the user equipment is configured or operating in a single transmit time interval (TTI) PDSCH or PUSCH scheduling mode or a multi-TTI PDSCH or PUSCH scheduling mode, the user equipment is configured to select the first processing timeline in the single-TTI PDSCH or PUSCH scheduling mode, and the user equipment is configured to select the second processing timeline in the multi-TTI PDSCH or PUSCH scheduling mode.

Clause 9: The method of claim 8, wherein: the user equipment is configured or operating in a multi-TTI PDSCH or PUSCH scheduling mode, and the method further comprises selecting one of the first processing timeline or the second processing timeline further based on a number of the TTIs associated with the multi-TTI PDSCH or PUSCH scheduling mode.

Clause 10: The method of Clause 2, wherein selecting one of the first processing timeline or the second processing timeline is based on a monitoring condition, and the signaling received from the base station determines a transmission time interval configuration for the user equipment.

Clause 11: The method of Clause 10, wherein: the signaling received from the base station comprises downlink control information (DCI), and the method further comprises: determining a number of transmission time intervals for the transmission time interval configuration based on the DCI; and selecting one of the first processing timeline or the second processing timeline further based on whether the number of transmission time intervals exceeds a threshold.

Clause 12: The method of Clause 11, further comprising: selecting the second processing timeline if the number of transmission time intervals exceeds the threshold;

and selecting the first processing timeline if the number of transmission time intervals is less than or equal to the threshold.

Clause 13: The method of Clause 12, wherein the threshold is 1.

Clause 14: The method of Clause 10, wherein the DCI comprises at least one of: a DCI field values indicating the number of transmission time intervals; a DCI format indicating the number of transmission time intervals; or a number of monitoring occasions indicating the number of transmission time intervals.

Clause 15: The method of any one of Clauses 2-14, further comprising: sending a capability report to the base station, wherein the capability report defines: the one or more first processing timeline parameter values corresponding to the one or more processing parameters defining the first processing timeline; and the one or more second processing timeline parameter values corresponding to the one or more processing parameters defining the second processing timeline.

Clause 16: The method of any one of Clauses 2-15, wherein: selecting one of the first processing timeline or the second processing timeline is based on one of the monitoring condition or the scheduling condition, and the method further comprises transmitting at least one of the monitoring condition or the scheduling condition to a base station, wherein the at least one of the monitoring condition or the scheduling condition indicates which of the first processing timeline or the second processing timeline is in use by the user equipment.

Clause 17: The method of any one of Clauses 2-16, further comprising: receiving the one or more first processing timeline parameter values from the base station via radio resource control signaling; and receiving the one or more second processing timeline parameter values from the base station via radio resource control signaling.

Clause 18: The method of Clause 17, wherein the one or more first processing timeline parameter values and the one or more second processing timeline parameter values are defined in a plurality of sets of time domain resource allocations (TDRA) lists.

Clause 19: The method of Clause 18, wherein each set of TDRA lists of the plurality of sets of TDRA lists comprises at least: a K0 value defining an offset between a downlink slot in which a PDCCH downlink control information for downlink scheduling is received and a downlink slot in which PDSCH data is scheduled; a K1 value defining an offset between the downlink slot in which the PDSCH data is scheduled and an uplink slot in which a HARQ-ACK feedback for the PDSCH data needs to be sent; and a K2 value defining an offset between the downlink slot in which the PDCCH downlink control information for downlink scheduling is received and an uplink slot in which uplink data needs to be sent on a PUSCH.

Clause 20: The method of Clause 17, wherein the one or more first processing timeline parameter values and the one or more second processing timeline parameter values are defined in a single set of time domain resource allocations (TDRA) lists.

Clause 21: The method of Clause 20, wherein the set of TDRA lists comprises at least: a K0 value defining an offset between a downlink slot in which a PDCCH downlink control information for downlink scheduling is received and a downlink slot in which PDSCH data is scheduled; a K1 value defining an offset between the downlink slot in which the PDSCH data is scheduled and an uplink slot in which a HARQ-ACK feedback for the PDSCH data needs to be sent; and a K2 value defining an offset between the downlink slot in which the PDCCH downlink control information for downlink scheduling is received and an uplink slot in which uplink data needs to be sent on a PUSCH.

Clause 22: The method of Clause 21, wherein K1 is larger than or equal to a minimum offset between a PDSCH data transmission on a downlink and a HARQ-ACK feedback on an uplink, wherein the minimum offset is determined by the one or more processing parameters.

Clause 23: The method of Clause 21, wherein K2 is larger than or equal to a minimum offset between a PDCCH transmission on a downlink and a PUSCH transmission on an uplink, wherein the minimum offset is determined by the one or more processing parameters.

Clause 24: The method of any one of Clauses 2-23, further comprising receiving the data from the base station for processing on an FR4 frequency band.

Clause 25: A method for wireless communication by a base station, comprising: determining a processing timeline for a user equipment; and processing data from the user equipment according to the determined processing timeline.

Clause 26: The method of Clause 25, wherein: determining a processing timeline for the user equipment comprises one of: receiving a capability report from a user equipment defining at least a first processing timeline and a second processing timeline for the user equipment; or transmitting a processing timeline configuration to the user equipment defining at least the first processing timeline and the second processing timeline for the user equipment, the first processing timeline is defined by one or more processing parameters and one or more corresponding first processing timeline parameter values for the one or more processing parameters, the second processing timeline are defined by the one or more processing parameters, and one or more corresponding second processing timeline parameter values for the one or more processing parameters, at least one of the one or more corresponding first processing timeline parameter values is different than a corresponding one of the one or more corresponding second processing timeline parameter values, and the first processing timeline is shorter than the second processing timeline.

Clause 27: The method of Clause 26, further comprising transmitting to the user equipment one or more values corresponding to one or more of the first processing timeline parameter values and the second processing timeline parameter values in the processing timeline configuration.

Clause 28: The method of Clause 27, further comprising transmitting to the user equipment the one or more values in radio resource control (RRC) signaling.

Clause 29: The method of Clause 27, wherein the one or more values are defined in a plurality of sets of time domain resource allocations (TDRA) lists.

Clause 30: The method of Clause 29, wherein each set of TDRA lists of the plurality of sets of TDRA lists comprises at least: a K0 value defining an offset between a downlink slot in which a PDCCH downlink control information for downlink scheduling is received and a downlink slot in which PDSCH data is scheduled; a K1 value defining an offset between the downlink slot in which the PDSCH data is scheduled and an uplink slot in which a HARQ-ACK feedback for the PDSCH data needs to be sent; and a K2 value defining an offset between the downlink slot in which the PDCCH downlink control information for downlink scheduling is received and an uplink slot in which uplink data needs to be sent on a PUSCH.

Clause 31: The method of Clause 27, wherein the one or more values are defined in a single set of time domain resource allocations (TDRA) lists.

Clause 32: The method of Clause 31, wherein the set of TDRA lists comprises at least: a K0 value defining an offset between a downlink slot in which a PDCCH downlink control information for downlink scheduling is received and a downlink slot in which PDSCH data is scheduled; a K1 value defining an offset between the downlink slot in which the PDSCH data is scheduled and an uplink slot in which a HARQ-ACK feedback for the PDSCH data needs to be sent; and a K2 value defining an offset between the downlink slot in which the PDCCH downlink control information for downlink scheduling is received and an uplink slot in which uplink data needs to be sent on a PUSCH.

Clause 33: The method of Clause 32, wherein K1 is larger than or equal to a minimum offset between a PDSCH data transmission on a downlink and a HARQ-ACK feedback on an uplink, wherein the minimum offset is determined by the one or more processing parameters.

Clause 34: The method of Clause 32, wherein K2 is larger than or equal to a minimum offset between a PDCCH transmission on a downlink and a PUSCH transmission on an uplink, wherein the minimum offset is determined by the one or more processing parameters.

Clause 35: The method of any one of Clauses 26-34, further comprising transmitting signaling to the user equipment configured to configure a transmission time interval for the user equipment.

Clause 36: The method of Clause 35, wherein: the signaling transmitted to the user equipment comprises downlink control information (DCI) configured to be used by the user equipment to: determine a number of transmission time intervals for the transmission time interval configuration based on the DCI; and select one of the first processing timeline or the second processing timeline further based on whether the number of transmission time intervals exceeds a threshold.

Clause 37: The method of Clause 36, wherein the threshold is 1.

Clause 38: The method of any one of Clauses 25-37, further comprising: receiving at least one of a monitoring condition or a scheduling condition from the user equipment, wherein the at least one of the monitoring condition or the scheduling condition indicates which of the first processing timeline or the second processing timeline is in use by the user equipment.

Clause 39: The method of any one of Clauses 25-38, further comprising: transmitting configuration signaling to the user equipment, wherein the configuration signaling is configured to cause the user equipment to enter one or more of a monitoring mode or a scheduling mode.

Clause 40: The method of Clause 39, further comprising determining that the user equipment is operating in one of the first processing timeline or second processing timeline based on the configuration signaling.

Clause 41: The method of any one of Clauses 25-40, further comprising: transmitting data to the user equipment for processing by the user equipment, wherein processing data from the user equipment according to the determined timeline comprises processing an acknowledgement from the user equipment in accordance with one of the first processing timeline or second processing timeline for the user equipment defined in the capability report.

Clause 42: An apparatus, comprising: a memory comprising executable instructions; one or more processors configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by one or more processors of an apparatus, cause the apparatus to perform a method in accordance with any one of Clauses 1-41.

Clause 45: A computer program product embodied on a computer-readable storage medium comprising code for performing a method in accordance with any one of Clauses 1-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/ duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of adapting processing timelines for high-frequency wireless communications. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (such as described with respect to 104 of FIGS. 1 and 2), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Program-mable Read-Only Memory), EEPROM (Electrically Eras-able Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execu-tion of the software module, the processor may load some of the instructions into cache to increase access speed. One or more cache lines may then be loaded into a general register file for execution by the processor. When referring to the functionality of a software module below, it will be under-stood that such functionality is implemented by the proces-sor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, inves-tigating, looking up (e.g., looking up in a table, a database or another data structure), ascertaining and the like. Also, "determining" may include receiving (e.g., receiving infor-mation), accessing (e.g., accessing data in a memory) and the like. Also, "determining" may include resolving, select-ing, choosing, establishing and the like.

The methods disclosed herein comprise one or more steps or actions for achieving the methods. The method steps and/or actions may be interchanged with one another with-out departing from the scope of the claims. In other words, unless a specific order of steps or actions is specified, the order and/or use of specific steps and/or actions may be modified without departing from the scope of the claims. Further, the various operations of methods described above may be performed by any suitable means capable of per-forming the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing dis-closed herein is intended to be dedicated to the public regardless of whether such disclosure is explicitly recited in the claims.

What is claimed is:

1. An apparatus comprising a processing system that includes one or more processors coupled to one or more memories, the processing system configured to cause the apparatus to:

receive configuration signaling;

receive a TTI configuration; and process downlink control signaling or downlink data that is received during a time period, wherein:

(i) the configuration signaling comprises a first physical downlink control channel (PDCCH) monitoring con-figuration, wherein the processing system is configured to cause the apparatus to process the downlink control signaling or the downlink data according to a first processing timeline that is defined by the one or more processing parameters and one or more corresponding first processing timeline parameter values for the one or more processing parameters, and wherein the TTI configuration indicates a first num-ber of TTIs associated with the first PDCCH monitoring configuration that is less than or equal to a threshold of 1; or (ii) the configuration signaling comprises a second PDCCH monitoring configuration, wherein the processing system is configured to cause the apparatus to process the downlink control signaling or the downlink data according to a second processing timeline that is different than the first processing timeline and that is defined by the one or more processing parameters and one or more corresponding second processing timeline parameter values for the one or more processing parameters, wherein at least one of one or more corresponding second processing timeline param-eter values are different than at least one of the one or more corresponding first processing timeline parameter values, and wherein the TTI configuration indicates a second number of TTIs associated with the second PDCCH monitoring configuration that exceeds the threshold of 1.

2. The apparatus of claim 1, wherein the one or more processing parameters comprise one or more of:

a PDCCH processing time;

a physical downlink shared channel (PDSCH) processing time;

a downlink or uplink scheduling offset;

a beam switching delay; or a radio frequency retuning delay.

3. The apparatus of claim 1, wherein:

the configuration signaling comprises the first PDCCH monitoring configuration, and the first PDCCH monitoring configuration comprises a per-slot PDCCH monitoring mode, or the configuration signaling comprises the second PDCCH monitoring configuration, and the second PDCCH monitoring configuration comprises a multi-slot PDCCH monitoring mode.

4. The apparatus of claim 1, wherein:

the configuration signaling comprises the first PDCCH monitoring configuration, and the first PDCCH monitoring configuration comprises a multi-slot PDCCH monitoring mode associated with a first periodicity, or the configuration signaling comprises the second PDCCH monitoring configuration, and the second PDCCH monitoring configuration comprises the multi-slot PDCCH monitoring mode associated with a second periodicity that is different than the first periodicity.

5. The apparatus of claim 1, wherein:

to cause the apparatus to receive the TTI configuration, the processing system is configured to cause the apparatus to receive the TTI configuration via downlink control information (DCI), and the DCI comprises at least one of:

a DCI field value indicating the number of TTIs;

a DCI format indicating the number of TTIs; or a number of monitoring occasions indicating the number of TTIs.

6. The apparatus of claim 1, wherein:

the processing system is configured to cause the apparatus to send a capability report; and the configuration signaling comprises the first PDCCH monitoring configuration, wherein the capability report defines the one or more corresponding first processing timeline parameter values for the one or more processing parameters that define the first processing timeline, or the configuration signaling comprises the second PDCCH monitoring configuration, wherein the capability report defines the one or more corresponding second processing timeline parameter values for the one or more processing parameters that define the second processing timeline.

7. The apparatus of claim 1, wherein:

the configuration signaling comprises the first PDCCH monitoring configuration, and the processing system is configured to cause the apparatus to transmit an indication that the first processing timeline is in use by the apparatus, or the configuration signaling comprises the second PDCCH monitoring configuration, and the processing system is configured to cause the apparatus to transmit an indication that the second processing timeline is in use by the apparatus.

8. The apparatus of claim 1, wherein:

the configuration signaling comprises the first PDCCH monitoring configuration;

the processing system is configured to cause the apparatus to process the downlink control signaling or the downlink data according to the first processing timeline that is defined by the one or more processing parameters and the one or more corresponding first processing timeline parameter values for the one or more processing parameters; and the TTI configuration indicates the first number of TTIs associated with the first PDCCH monitoring configuration that is less than or equal to the threshold of 1.

9. The apparatus of claim 1, wherein:

the configuration signaling comprises the second PDCCH monitoring configuration;

the processing system is configured to cause the apparatus to process the downlink control signaling or the downlink data according to the second processing timeline that is different than the first processing timeline and that is defined by the one or more processing parameters and the one or more corresponding second processing timeline parameter values for the one or more processing parameters; and the TTI configuration indicates the second number of TTIs associated with the second PDCCH monitoring configuration that exceeds the threshold of 1.

10. An apparatus comprising a processing system that includes one or more processors and one or more memories coupled with the one or more processors, the processing system configured to cause the apparatus to:

receive configuration signaling; and process downlink control signaling or downlink data that is received during a time period, wherein:

(i) the configuration signaling comprises a first physical downlink control channel (PDCCH) monitoring configuration or a first physical downlink shared channel (PDSCH) or physical uplink shared channel (PUSCH) scheduling configuration, wherein the processing system is configured to cause the apparatus to process the downlink control signaling or the downlink data according to a first processing timeline that is defined by the one or more processing parameters and one or more corresponding first processing timeline parameter values for the one or more processing parameters, and wherein the one or more first corresponding processing timeline parameter values are defined in a set of time domain resource allocations (TDRA) lists; or (ii) the configuration signaling comprises a second PDCCH monitoring configuration or a second PDSCH or PUSCH scheduling configuration, wherein the processing system is configured to cause the apparatus to process the downlink control signaling or the downlink data according to a second processing timeline that is different than the first processing timeline and that is defined by the one or more processing parameters and one or more corresponding second processing timeline parameter values for the one or more processing parameters, wherein at least one of one or more corresponding second processing timeline parameter values are different than at least one of the one or more corresponding first processing timeline parameter values, and wherein the one or more second corresponding processing timeline parameter values are defined in the set of TDRA lists, and wherein the set of TDRA lists comprises at least:

a K0 value defining an offset between a downlink slot in which a PDCCH downlink control information for downlink scheduling is received and a downlink slot in which PDSCH data is scheduled, a K1 value defining an offset between the downlink slot in which the PDSCH data is scheduled and an uplink slot in which a HARQ-ACK feedback for the PDSCH data needs to be sent, and a K2 value defining an offset between the downlink slot in which the PDCCH downlink control information for downlink scheduling is received and an uplink slot in which uplink data needs to be sent on a PUSCH, and wherein:

K1 is larger than or equal to a minimum offset between a PDSCH data transmission on a downlink and a HARQ-ACK feedback on an uplink, and the minimum offset is determined by the one or more processing parameters, or K2 is larger than or equal to a minimum offset between a PDCCH transmission on a downlink and a PUSCH transmission on an uplink, and the minimum offset is determined by the one or more processing parameters.

11. The apparatus of claim 10, wherein K1 is larger than or equal to the minimum offset between the PDSCH data transmission on the downlink and the HARQ-ACK feedback on the uplink, and the minimum offset is determined by the one or more processing parameters.

12. The apparatus of claim 10, wherein K2 is larger than or equal to the minimum offset between the PDCCH transmission on the downlink and the PUSCH transmission on the uplink, and the minimum offset is determined by the one or more processing parameters.

13. The apparatus of claim 10, wherein:

the configuration signaling comprises the first PDCCH monitoring configuration or the first PDSCH or PUSCH scheduling configuration;

the processing system is configured to cause the apparatus to process the downlink control signaling or the downlink data according to the first processing timeline that is defined by the one or more processing parameters and the one or more corresponding first processing timeline parameter values for the one or more processing parameters; and wherein the one or more first corresponding processing timeline parameter values are defined in the set of TDRA lists.

14. The apparatus of claim 10, wherein:

the configuration signaling comprises the second PDCCH monitoring configuration or the second PDSCH or PUSCH scheduling configuration;

the processing system is configured to cause the apparatus to process the downlink control signaling or the downlink data according to the second processing timeline that is different than the first processing timeline and that is defined by the one or more processing parameters and the one or more corresponding second processing timeline parameter values for the one or more processing parameters, wherein at least one of one or more corresponding second processing timeline parameter values are different than at least one of the one or more corresponding first processing timeline parameter values; and the one or more second corresponding processing timeline parameter values are defined in the set of TDRA lists.

15. A method of wireless communications, comprising:

receiving configuration signaling;

receiving a TTI configuration; and processing downlink control signaling or downlink data that is received during a time period, wherein:

(i) the configuration signaling comprises a first physical downlink control channel (PDCCH) monitoring configuration, wherein the method comprises processing the downlink control signaling or the downlink data according to a first processing timeline that is defined by the one or more processing parameters and one or more corresponding first processing timeline parameter values for the one or more processing parameters, and wherein the TTI configuration indicates a first number of TTIs associated with the first PDCCH monitoring configuration that is less than or equal to a threshold of 1; or (ii) the configuration signaling comprises a second PDCCH monitoring configuration, wherein the method comprises processing the downlink control signaling or the downlink data according to a second processing timeline that is different than the first processing timeline and that is defined by the one or more processing parameters and one or more corresponding second processing timeline parameter values for the one or more processing parameters, wherein at least one of one or more corresponding second processing timeline parameter values are different than at least one of the one or more corresponding first processing timeline parameter values, and wherein the TTI configuration indicates a second number of TTIs associated with the second PDCCH monitoring configuration that exceeds the threshold of 1.

16. The method of claim 15, wherein the one or more processing parameters comprise one or more of:

a PDCCH processing time;

a physical downlink shared channel (PDSCH) processing time;

a downlink or uplink scheduling offset;

a beam switching delay; or a radio frequency retuning delay.

17. The method of claim 15, wherein:

the configuration signaling comprises the first PDCCH monitoring configuration, and the first PDCCH monitoring configuration comprises a per-slot PDCCH monitoring mode, or the configuration signaling comprises the second PDCCH monitoring configuration, and the second PDCCH monitoring configuration comprises a multi-slot PDCCH monitoring mode.

18. The method of claim 15, wherein:

the configuration signaling comprises the first PDCCH monitoring configuration, and the first PDCCH monitoring configuration comprises a multi-slot PDCCH monitoring mode associated with a first periodicity, or the configuration signaling comprises the second PDCCH monitoring configuration, and the second PDCCH monitoring configuration comprises the multi-slot PDCCH monitoring mode associated with a second periodicity that is different than the first periodicity.

19. The method of claim 15, wherein:

receiving the TTI configuration comprises receiving the TTI configuration via downlink control information (DCI), and the DCI comprises at least one of:

a DCI field value indicating the number of TTIs;

a DCI format indicating the number of TTIs; or a number of monitoring occasions indicating the number of TTIs.

20. The method of claim 15, wherein:
the method comprises sending a capability report; and
the configuration signaling comprises the first PDCCH monitoring configuration, wherein the capability report defines the one or more corresponding first processing timeline parameter values for the one or more processing parameters that define the first processing timeline, or
the configuration signaling comprises the second PDCCH monitoring configuration, wherein the capability report defines the one or more corresponding second processing timeline parameter values for the one or more processing parameters that define the second processing timeline.

21. The method of claim 15, wherein:
the configuration signaling comprises the first PDCCH monitoring configuration, and the method comprises transmitting an indication that the first processing timeline is in use by the apparatus, or
the configuration signaling comprises the second PDCCH monitoring configuration, and the method comprises transmitting an indication that the second processing timeline is in use by the apparatus.

22. The method of claim 15, wherein:
the configuration signaling comprises the first PDCCH monitoring configuration;
the method comprises processing the downlink control signaling or the downlink data according to the first processing timeline that is defined by the one or more processing parameters and the one or more corresponding first processing timeline parameter values for the one or more processing parameters; and
the TTI configuration indicates the first number of TTIs associated with the first PDCCH monitoring configuration that is less than or equal to the threshold of 1.

23. The method of claim 15, wherein:
the configuration signaling comprises the second PDCCH monitoring configuration;
the method comprises processing the downlink control signaling or the downlink data according to the second processing timeline that is different than the first processing timeline and that is defined by the one or more processing parameters and the one or more corresponding second processing timeline parameter values for the one or more processing parameters; and
the TTI configuration indicates the second number of TTIs associated with the second PDCCH monitoring configuration that exceeds the threshold of 1.

24. A method of wireless communications, comprising:
receiving configuration signaling; and
processing downlink control signaling or downlink data that is received during a time period,
wherein:
(i) the configuration signaling comprises a first physical downlink control channel (PDCCH) monitoring configuration or a first physical downlink shared channel (PDSCH) or physical uplink shared channel (PUSCH) scheduling configuration,
wherein the method comprises processing the downlink control signaling or the downlink data according to a first processing timeline that is defined by the one or more processing parameters and one or more corresponding first processing timeline parameter values for the one or more processing parameters, and wherein the one or more first corresponding processing timeline parameter values are defined in a set of time domain resource allocations (TDRA) lists; or
(ii) the configuration signaling comprises a second PDCCH monitoring configuration or a second PDSCH or PUSCH scheduling configuration,
wherein the method comprises processing the downlink control signaling or the downlink data according to a second processing timeline that is different than the first processing timeline and that is defined by the one or more processing parameters and one or more corresponding second processing timeline parameter values for the one or more processing parameters, wherein at least one of one or more corresponding second processing timeline parameter values are different than at least one of the one or more corresponding first processing timeline parameter values, and
wherein the one or more second corresponding processing timeline parameter values are defined in the set of TDRA lists, and
wherein the set of TDRA lists comprises at least:
a K0 value defining an offset between a downlink slot in which a PDCCH downlink control information for downlink scheduling is received and a downlink slot in which PDSCH data is scheduled,
a K1 value defining an offset between the downlink slot in which the PDSCH data is scheduled and an uplink slot in which a HARQ-ACK feedback for the PDSCH data needs to be sent, and
a K2 value defining an offset between the downlink slot in which the PDCCH downlink control information for downlink scheduling is received and an uplink slot in which uplink data needs to be sent on a PUSCH, and
wherein:
K1 is larger than or equal to a minimum offset between a PDSCH data transmission on a downlink and a HARQ-ACK feedback on an uplink, and the minimum offset is determined by the one or more processing parameters, or
K2 is larger than or equal to a minimum offset between a PDCCH transmission on a downlink and a PUSCH transmission on an uplink, and the minimum offset is determined by the one or more processing parameters.

25. The method of claim 24, wherein K1 is larger than or equal to the minimum offset between the PDSCH data transmission on the downlink and the HARQ-ACK feedback on the uplink, and the minimum offset is determined by the one or more processing parameters.

26. The method of claim 24, wherein K2 is larger than or equal to the minimum offset between the PDCCH transmission on the downlink and the PUSCH transmission on the uplink, and the minimum offset is determined by the one or more processing parameters.

27. The method of claim 24, wherein:
the configuration signaling comprises the first PDCCH monitoring configuration or the first PDSCH or PUSCH scheduling configuration;
the method comprises processing the downlink control signaling or the downlink data according to the first processing timeline that is defined by the one or more processing parameters and the one or more corresponding first processing timeline parameter values for the one or more processing parameters; and wherein the one or more first corresponding processing timeline parameter values are defined in the set of TDRA lists.

28. The method of claim 24, wherein:

the configuration signaling comprises the second PDCCH monitoring configuration or the second PDSCH or PUSCH scheduling configuration;

the method comprises processing the downlink control signaling or the downlink data according to the second processing timeline that is different than the first processing timeline and that is defined by the one or more processing parameters and the one or more corresponding second processing timeline parameter values for the one or more processing parameters, wherein at least one of one or more corresponding second processing timeline parameter values are different than at least one of the one or more corresponding first processing timeline parameter values; and the one or more second corresponding processing timeline parameter values are defined in the set of TDRA lists.

* * * * *